United States Patent [19]
Howle

[11] Patent Number: 5,806,411
[45] Date of Patent: Sep. 15, 1998

[54] PASTRY SHIELD AND COOLING STAND

[76] Inventor: Jennifer Howle, 7525 Holly Hill, #66, Dallas, Tex. 75206

[21] Appl. No.: 775,761

[22] Filed: Dec. 31, 1996

[51] Int. Cl.[6] .................................................. A47J 43/00
[52] U.S. Cl. ............................... 99/433; 99/447; 99/645; 99/DIG. 15
[58] Field of Search .............................. 99/645, DIG. 15, 99/433, 447

[56] References Cited

U.S. PATENT DOCUMENTS

| | | |
|---|---|---|
| 385,683 | 7/1888 | Phelps . |
| 868,312 | 10/1907 | Wilcox . |
| 1,375,539 | 4/1921 | Scott . |
| 1,420,466 | 6/1922 | Bakken . |
| 1,673,947 | 6/1928 | Paddison . |
| 2,222,512 | 11/1940 | Moyen ..................................... 99/433 |
| 2,288,795 | 7/1942 | Earl .................................. 99/DIG. 15 |
| 3,431,836 | 3/1969 | Murrell . |
| 3,478,674 | 11/1969 | Medeiros .............................. 99/447 X |
| 5,456,162 | 10/1995 | Polizzotto ............................. 99/645 X |

*Primary Examiner*—Reginald L. Alexander
*Attorney, Agent, or Firm*—David W. Carstens; Carstens Yee & Cahoon

[57] ABSTRACT

The pastry shield has a upper flange dimensioned to overlap the periphery of the pastry or pie being baked. The flange reflects heat away from the easily burned portions of the pastry. Further, the pastry shield can have cooling fins attached or integral therewith. These fins help pull heat in the shield away from the pastry. The fins also help after baking when the pastry is cooled. The pastry's pan can be set on top of the shield and the heat in the pastry and pan will tend to drain into the shield and be dissipated through the fins.

12 Claims, 3 Drawing Sheets

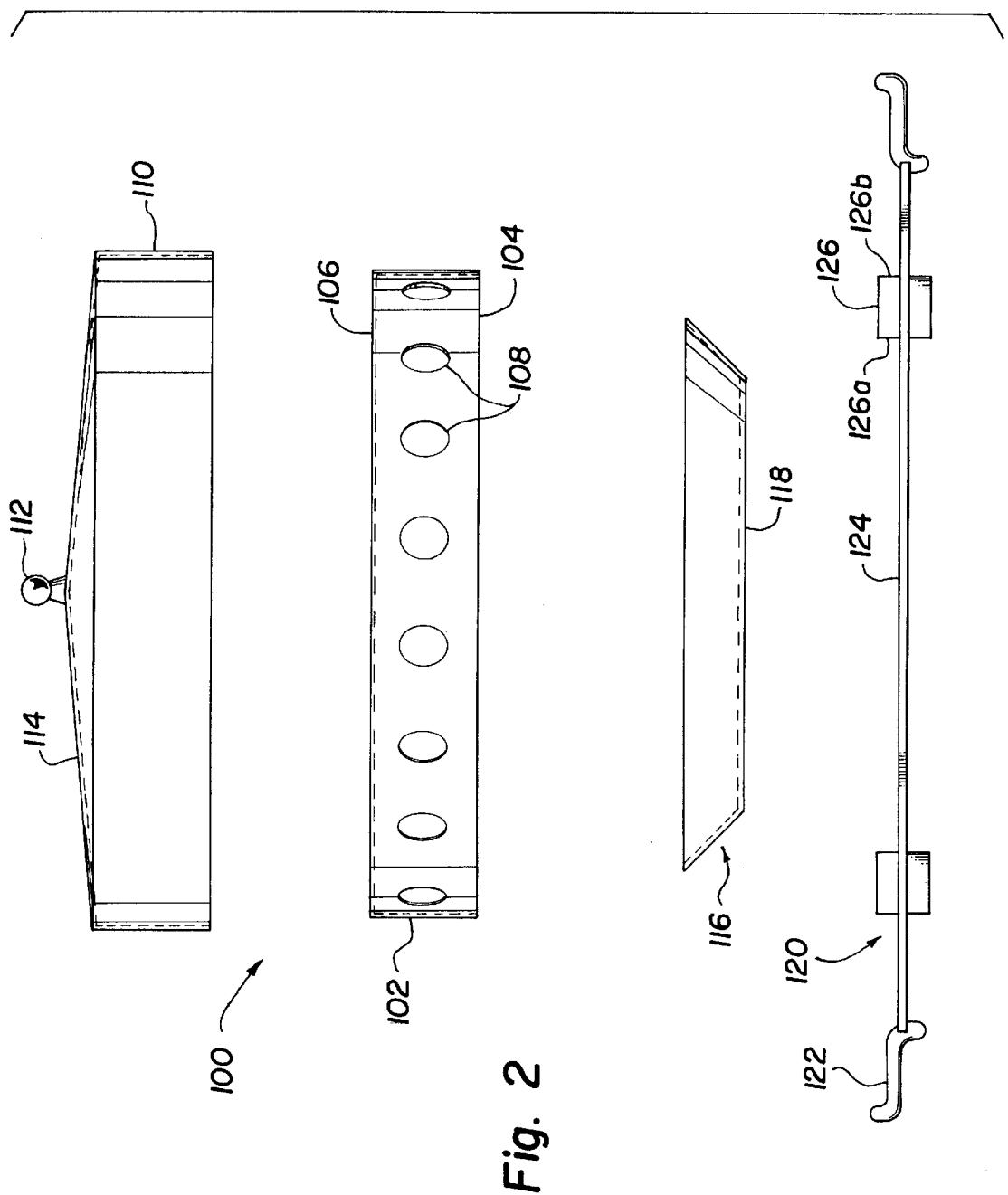

PASTRY SHIELD AND COOLING STAND

TECHNICAL FIELD OF THE INVENTION

The present invention relates to a pastry shield and cooling stand for protecting pastry crusts and other baked goods from burning during baking. Specifically, the invention uses an improved heat dissipation ring which protects a portion of the baked goods from burning.

BACKGROUND OF THE INVENTION

Baking is a highly refined art. Many have devoted their lives to improving the quality of our cuisine. Baked goods present a significant challenge to a cook. Pies and other confectioneries in particular are difficult to bake. A pie for example has a crust and a filling, each which cook at a different rate, yet the entire pie is subjected to the same heating in an oven. This typically leads to either burning the crust or undercooking the filling.

Several pastry shields have been developed to protect a crust from burning. For example, U.S. Pat. No. 1,375,539 entitled "Protecting Shield for Use in Baking Pastry." This reference discloses the general concept of using a frame to shield the edges of crust of a pie to prevent burning. The Scott '539 shield is dimensioned to be slightly larger than the pie plate so as to allow air circulation between the pie pan and the shield during baking. The Scott '539 shield is only suitable for the single purpose of protecting the crust from burning. The baking process also requires that the pie be cooled after it has been baked. Thus, a need exists for a single utensil that will both shield a pie or other pastry during baking and also aid in cooling the pie after baking.

SUMMARY OF THE INVENTION

The present invention relates to a pastry shield suitable for use with pastries, pies, and any other baked goods. The pastry shield protects the more quickly baked portions such as the thin crust around the periphery of a pastry or pie. Moreover, the same shield can be used to more rapidly cool the pastry after baking. In another embodiment, the pastry shield can be coupled to an insulated cover. Thus, after the pastry is baked, it can be stored under the shield and cover, keeping the pastry warm for a longer time.

The pastry shield, in one embodiment, is generally circular with a partial inwardly extending lip. The shield is placed around the pastry during baking. In an oven, the heat transferred to a pastry occurs through conduction, convection and radiation. Convection occurs when the hot air within the oven moves over the pastry. It transfers heat much more rapidly than still air. Thus, the shield tends to create a barrier for the pastry edges which prevents excessive convective heating. Likewise, the inwardly extending lip tends to block radiative heating between the heating elements in the oven and the cooler pie. However, as might be expected, the shield itself begins to store an excessive amount of heat. This heat buildup in the shield is minimized by the use of cooling fins attached or integral with the perimeter of the shield. The fins carry the heat away from the main body of the shield which is closer to the pastry.

The pastry shield is also useful in the cooling of the pie. When the pie and shield are removed from the oven, the pie can be set on top of the shield. Heat is still drawn from the pie pan and into the shield, and then dissipated through the fins on the shield. The fins can be any suitable shape and any suitable material. It is anticipated that the fins will be radial and made of the same material as the shield.

In another embodiment, the shield can be coupled to an insulating cover. The cover is dimensioned to closely fit around the shield and fins. The cover will have a very low heat transfer ability. Thus, if the user wants to maintain the pie at an elevated temperature, she can place the pie either on top of or under the shield and then place the cover over both the pie and the shield. The heat of the pie and the shield will be stored, keeping the temperature of the pie higher for a longer period of time.

In another embodiment, the shield and cover can be coupled to a base. In this embodiment, a base is dimensioned to accept the lower edge of the shield. The base can have handles, which makes moving the hot pastry and shield easier.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 2 is an exploded view of an alternative embodiment of the invention; and

DETAILED DESCRIPTION OF THE DRAWINGS

Figure 1:
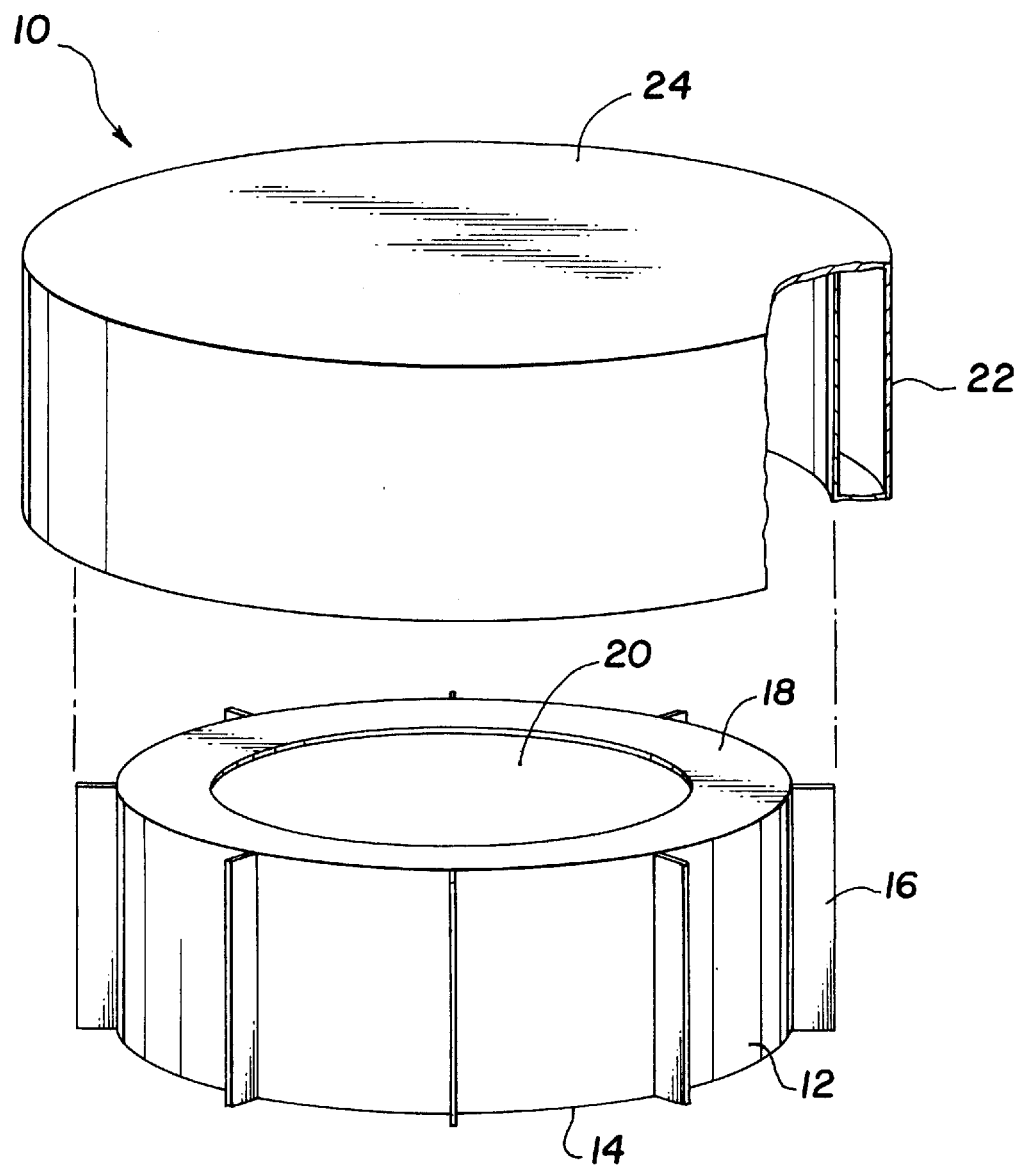
FIG. 1 is an exploded view of the pastry shield and insulating ring.

The present invention relates to a baking shield that overcomes many of the disadvantages found in the prior art. A shield 10, embodying the present invention, is illustrated in FIG. 1.

The shield is typically made of a metal such as aluminum. However, the shield could be a ceramic or plastic as well. The shield 10 has a side wall 12 and an inwardly extending upper lip 18. A lower edge 14 of the shield 12 can be used to cut dough. A central opening 20 is defined by the inwardly extending lip 18 and can be any suitable size. The shield shown is generally round, however, the shield could be any shape, including rectangular, square or oval.

Radial fins 16 are thermally coupled to the ring so that any heat in the shield can pass to the fins. The fins can radiate the heat and provide a thermal advantage for the pastry shield. Fins 16 can be any shape or size. Radial fins are preferred due to the ease of manufacture. The fins can be the same material as the shield or other appropriate material. In any case, both the fins and the shield should be able to withstand the normal temperatures experienced during baking.

As discussed below in greater detail, the shield can also be used to help cool a hot pastry or other baked good. For example, when the pan containing the pastry is removed from the oven, it can be set on top of the shield. Pans typically have sloped side walls leading to a reduced diameter base. The base can set into the opening 20 in the shield. Then heat from the baked good can pass to the shield through its pan. The heat in the shield will then be dissipated through the fins. Alternatively, if the user wants to retard the cooling process, an insulated cover 22 can be placed over the shield. The insulated cover 22 can have a closed upper surface 24 to help trap heat. Further, to improve its insulative properties, the cover 22 can include an insulating layer. The insulating layer can be captured between the inner and outer surfaces of the cover. Further, the insulating layer could simply be an air layer. The insulating layer could also act as either the inner or outer layer of the cover. Alternatively, the entire cover could be made of a single material with a low thermal conductivity.

Referring to FIG. 2, an alternative shield 102 is disclosed as part of a system 100. The shield is similar to the embodiment disclosed in FIG. 1, however, rather than fins, the shield 102 contains a plurality of holes 108 through its side walls. The holes allow steam from the baking goods to escape. The shield 102 has a lower edge 104 dimensioned to engage a tray 120. Further, the shield 102 also includes an inwardly extending lip 106. The shield 102 is also dimensioned to fit over a pan 116 for the pastry or other baked good. The pan has a reduced diameter bottom surface 118. The system 100 also includes a cover 110 having a closed upper surface 114 and a handle 112. In use, the pan 116, shield 102 and cover 110 can each engage each other in a variety of ways. The tray 120 has handles 122 and a central portion 124. In this example, the tray further has a collar 126 which bounds the central portion 124. The collar 126 has an inner diameter 126a and an outer diameter 126b. The inner diameter 126a closely matches the shape and outer diameter of the shield 102. Thus, a pan 116 can be placed on the central portion 124 of the tray 120 and the shield 102 placed down over the pan. The collar will essentially capture the shield and prevent it and the pan from sliding across the surface of the tray. The cover 110 can then be placed over the pan 116 and shield 110. The outer diameter 126b of the collar 126 closely matches the inner diameter of the cover 110. Thus, the collar 126 essentially captures the cover 110 and prevents it from sliding across the surface of the tray.

Figure 3C:
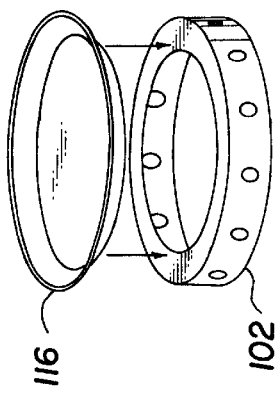
FIGS. 3a to 3f illustrate various configurations for the pastry shield, cover and base.
Figure 3B:
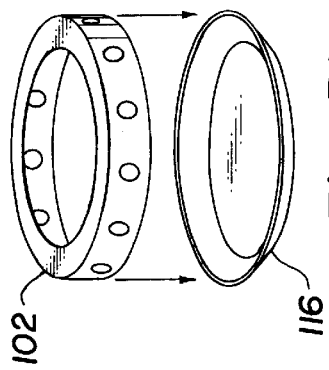
Figure 3A:
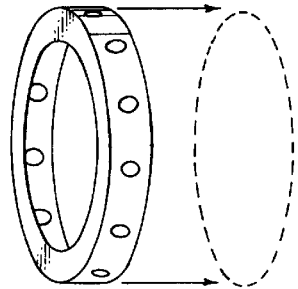
Figure 3F:
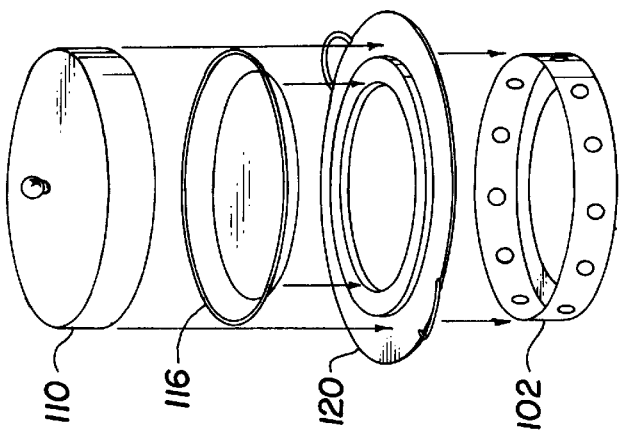
Figure 3E:
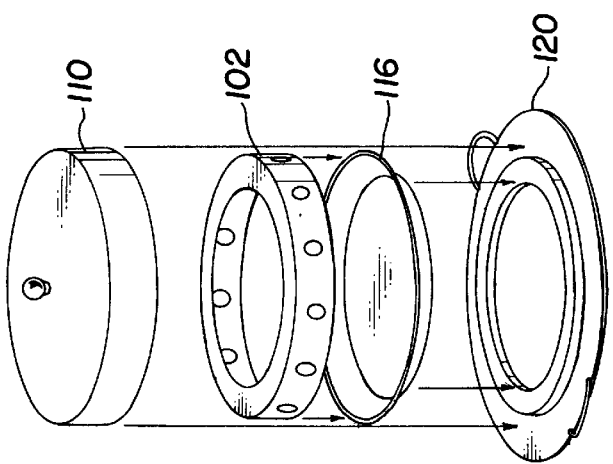
Figure 3D:
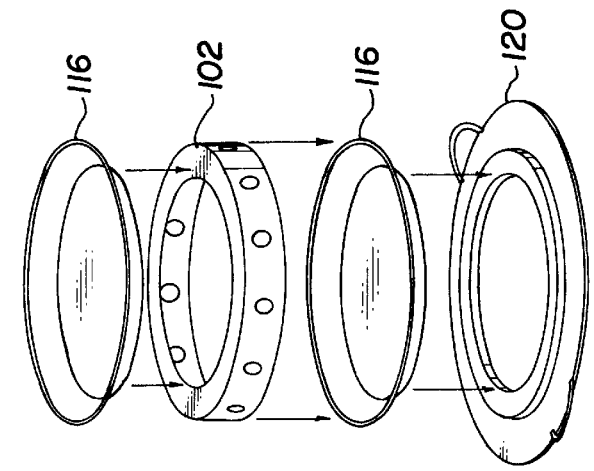

The arrangement described above is also illustrated in FIG. 3e. However, the elements above can be arranged in a number of useful configurations. For example, FIG. 3a illustrate the lower edge of the shield or frame 102 being used to cut dough. FIG. 3b illustrates the use of the shield 102 over the pan 116. This arrangement is useful in baking as discussed above. FIG. 3c illustrates the use of the shield 102 as a cooling rack for the hot pan 116 after baking. FIG. 3d illustrates the use of the shield 102 to stack two pans. The shield would, of course, need to be sufficiently tall to allow for the stacking of tall deserts in the pans. FIG. 3f illustrates the use of the shield 102 as a base for the tray 120. This configuration raises the tray and makes it more suitable for presentation of the pastry in the pan 116.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

I claim:

1. A pastry shield for use in baking a bakable good, said bakable good positioned in a pan and having a first portion which requires less time to bake than a second portion, said pastry shield comprising:

(a) a ring dimensioned to surround said bakable good;
    (b) heat dissipation fins thermally coupled to said ring; and
    (c) an insulating cover dimensioned to surround said ring.

2. The pastry shield of claim 1 wherein said ring is generally circular.

3. The pastry shield of claim 1 wherein said ring is generally rectangular.

4. The pastry shield of claim 1 wherein said fins comprise radially extending fins.

5. The pastry shield of claim 1 wherein said ring further comprises a lower edge and an upper edge, said upper edge having an inwardly extending lip.

6. The pastry shield of claim 5 wherein said inwardly extending ring defines a central opening suitable for accepting a pan.

7. The pastry shield of claim 1 wherein said insulating cover comprises an open lower surface having a cover dimension.

8. The pastry shield of claim 7 further comprises a tray having a central portion defined by a collar having a collar inner diameter and a collar outer diameter.

9. The pastry shield of claim 8 wherein said cover diameter closely matches the collar outer diameter.

10. The pastry shield of claim 8 wherein said ring has a diameter which closely matches the collar inner diameter.

11. The pastry shield of claim 5 wherein said inwardly extending lip is dimensioned to substantially cover the first portion of the bakable good.

12. A pastry shield for protecting a portion of a bakable good from burning comprising:

(a) a generally circular ring having a planar side wall;
    (b) an inwardly extending lip on an upper edge of the ring;
    (c) at least one heat dissipation fin thermally coupled to said ring;
    (d) and an insulating cover dimensioned to surround ring.

* * * * *